United States Patent
Li

(10) Patent No.: US 8,055,243 B2
(45) Date of Patent: Nov. 8, 2011

(54) SYSTEM AND METHOD FOR EMAIL NOTIFICATION OF UNANSWERED TELEPHONE CALLS

(75) Inventor: Bourne Bao Li, Shandong (CN)

(73) Assignee: Alcatel Lucent, Paris (FR)

( * ) Notice: Subject to any disclaimer, the term of this patent is extended or adjusted under 35 U.S.C. 154(b) by 1416 days.

(21) Appl. No.: 11/584,599

(22) Filed: Oct. 23, 2006

(65) Prior Publication Data

US 2007/0263841 A1 Nov. 15, 2007

(30) Foreign Application Priority Data

Apr. 28, 2006 (CN) .......................... 2006 1 0092720

(51) Int. Cl.
*H04M 1/725* (2006.01)
(52) U.S. Cl. ............... 455/412.2; 379/88.13; 379/88.25; 370/352
(58) Field of Classification Search .... 379/88.01–88.28; 455/412.2; 370/352
See application file for complete search history.

(56) References Cited

U.S. PATENT DOCUMENTS

| | | | | |
|---|---|---|---|---|
| 5,949,869 A * | 9/1999 | Sink et al. | ............... | 379/221.05 |
| 5,974,122 A * | 10/1999 | Nelson et al. | ............ | 379/100.09 |
| 6,085,231 A * | 7/2000 | Agraharam et al. | .......... | 709/206 |
| 6,282,275 B1 * | 8/2001 | Gurbani et al. | .......... | 379/142.06 |
| 6,445,694 B1 * | 9/2002 | Swartz | .......................... | 370/352 |
| 6,631,400 B1 * | 10/2003 | DiStefano, III | ............... | 709/206 |
| 6,683,940 B2 * | 1/2004 | Contractor | ................. | 379/88.17 |
| 6,965,666 B1 | 11/2005 | Zhang | | |
| 7,177,406 B2 * | 2/2007 | Caputo et al. | ............... | 379/88.18 |
| 7,568,151 B2 * | 7/2009 | Bargeron et al. | ............. | 715/231 |
| 2004/0233892 A1 * | 11/2004 | Roberts et al. | ................. | 370/352 |
| 2004/0235520 A1 * | 11/2004 | Cadiz et al. | ................... | 455/557 |
| 2006/0089883 A1 * | 4/2006 | Jeffery Peoples | .............. | 705/26 |

FOREIGN PATENT DOCUMENTS

| | | |
|---|---|---|
| EP | 0 978 983 | 2/2000 |
| EP | 1 113 631 | 7/2001 |
| EP | 1113631 A2 * | 7/2001 |
| WO | WO 03/047231 | 6/2003 |
| WO | WO 2006/039552 | 4/2006 |

OTHER PUBLICATIONS

Notification of Transmittal of the International Search Report and the Written Opinion of the International Searching Authority, or the Declaration mailed Oct. 2, 2007.
Chinese Office Action dated Nov. 25, 2010 issued in corresponding Chinese application No. 20061092720.0 and English translation thereof.

* cited by examiner

*Primary Examiner* — Simon Sing
*Assistant Examiner* — Assad Mohammed
(74) *Attorney, Agent, or Firm* — Harness, Dickey & Pierce, P.L.C.

(57) ABSTRACT

A method of processing a telephone call that includes creating an email notification of the telephone call if the telephone call to a telephone number registered to receive email notifications is determined unanswered and sending the email notification based on information associated with the registered telephone number.

8 Claims, 3 Drawing Sheets

SYSTEM AND METHOD FOR EMAIL NOTIFICATION OF UNANSWERED TELEPHONE CALLS

PRIORITY STATEMENT

This non-provisional U.S. patent application claims priority under 35 U.S.C. §119 to Chinese Patent Application No. 200610092720.0, filed on Apr. 28, 2006, the entire contents of which are incorporated herein by reference.

BACKGROUND OF INVENTION

1. Field of the Invention

The present invention is related to a system and method for telecommunications. More particularly, the present invention relates to a system and method for email notification of unanswered telephone calls.

2. Background Information

When a person relocates to a new address or is traveling on vacation or on a business trip, the person may miss telephone calls placed to the person's home or office telephone number. Further, if a person is traveling on vacation or on a business trip, a subscriber's wireless communications device may not be supported in the vacation or business trip location(s).

In conventional telephone communication systems, when a telephone company's subscriber is away from his local telephone number (i.e., home or office telephone number) or his wireless communication device is not supported in a location, a party calling the subscriber at the local telephone number or wireless telephone number will be forced to leave a message on a voicemail or will simply have to try calling the subscriber again at a later date.

Unfortunately, the subscriber may not be able to access their voicemail. For example, the cell phone of a U.S. subscriber generally does not work in South Korea. As a result, the subscriber may not be able to obtain information about unanswered calls or voicemail messages in these situations.

SUMMARY OF THE INVENTION

One or more example embodiments of the present invention are directed towards a system and/or method for email notification of unanswered telephone calls.

An example embodiment of the present invention provides a method of processing a telephone call. The method includes creating an email notification of the telephone call if the telephone call to a telephone number registered to receive email notifications is determined unanswered and sending the email notification based on information associated with the registered telephone number. The email notification may include one or more of a calling party number, a calling party name, a time of the call, a date of the call, an audio file of a voice message, and text of a voice message.

According to an example embodiment of the present invention, the method also includes determining based on a database record associated with the telephone number if the telephone number is registered to receive email notifications. The database record is obtained from a database based on the telephone number and includes call handling instructions.

According to an example embodiment of the present invention, the call handling instructions included in the database record may include one or more of an indication the telephone number is registered to receive email notifications, an indication the telephone number is registered to receive voicemail service, an indication the call will be unanswered, an email address to send the email notifications, and instructions of when to send the email notifications.

An example embodiment provides a system for processing a telephone call. The system includes an intelligent processor that creates an email notification of the telephone call if the telephone call to a telephone number registered to receive email notifications is determined unanswered. The intelligent processor also sends the email notification based on information associated with the registered telephone number.

According to an example embodiment of the present invention, the system may also include a service control point (SCP) and a service switching point (SSP). The SCP obtains a database record from a database based on the telephone number. The database record includes call handling instructions. The call handling instructions includes one or more of an indication the telephone number is registered to receive email notifications, an indication the telephone number is registered to receive voicemail service, an indication the call will be unanswered, an email address to send the email notifications, and instructions of when to send the email notifications.

The SSP receives the telephone call, forwards the telephone call based on the call handling instructions to at least one of the intelligent processor and a terminal associated with the telephone number, and determines the call unanswered.

According to an example embodiment of the present invention, the intelligent processor includes a memory for recording a voice message as an audio file if the call handling instructions indicate the telephone number is registered to receive voicemail service. The intelligent processor may also include a speech-to-text converter for converting the recorded voice message to text if the call handling instructions indicate to convert the recorded voice message to text.

According to an example embodiment of the present invention, the system also includes an email server. The email server receives the email notification from the intelligent processor, stores the email notification and forwards the email notification to an email address.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Before describing an example embodiment of the present invention, key intelligent network elements will be described. Intelligent network components suitable for implementing example embodiments of the present invention are well-known in the art and commercially available.

Figure 1:
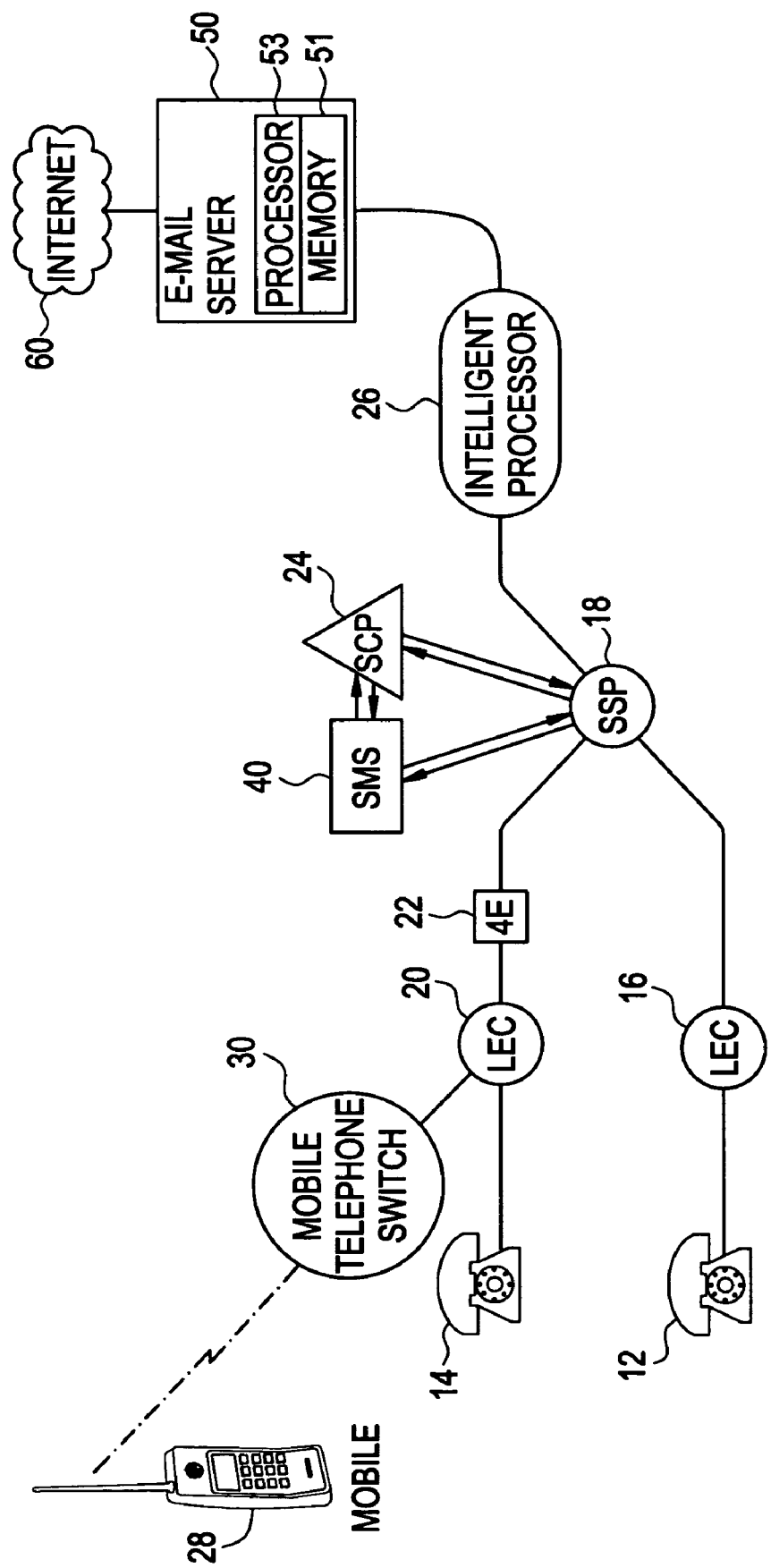
FIG. 1 is a block diagram of a telecommunications network architecture.

FIG. 1 is a block diagram of an example intelligent network architecture suitable for implementing a method for email notification of unanswered telephone calls according to an example embodiment of the present invention.

The intelligent network architecture has a modular configuration of network elements to provide enhanced telecommunications services. Switching functions are performed by the base network in a conventional manner. The intelligent network architecture in FIG. 1 includes a service switching point (SSP) 18, a service control point (SCP) 24, a service management system (SMS) 40, an intelligent processor (IP) 26, and an email server 50.

One skilled in the art will appreciate that the intelligent network elements could be owned or controlled by a local exchange carrier (LEC), an interexchange carrier (not shown), a competitive access provider (not shown), or some combination of the three.

The SSP 18 is a switch that recognizes service requests, requests call handling instructions from the SCP 24, and executes the call handling instructions to complete a telephone call, forwarding procedure, messaging procedure, and/or email notification procedure. The SSP 18 provides intelligent network "triggering".

Triggering is the process by which the SSP 18 determines that a query message requesting call handling instructions should be sent to the SCP 24. A trigger is an occurrence of an event and/or the satisfaction of certain conditions which result in a message to the SCP 24. Triggers can be originating triggers, mid-call triggers, or terminating triggers. Examples of originating triggers are off-hook immediate, off-hook delay triggers, and custom dialing plan triggers. An example of a mid-call trigger is the busy condition. An example of a terminating trigger is the ring-no answer condition. According to example embodiments of the present invention, a trigger is generated whenever a call is unanswered and/or a dialed telephone number matches one of the telephone numbers included in a list of telephone numbers.

The list of telephone numbers includes a list of telephone numbers of subscribers, which have registered for various services offered by a service provider, for example, a telephone company. According to an example embodiment of the present invention, an email notification service is provided in which a telephone company's subscriber can register to receive email notifications of unanswered telephone calls. Other services include, but are not limited to, call forwarding and voicemail.

The SSP 18 also formulates and transmits requests to the SCP 24 and processes replies and/or call handling instructions received from the SCP 24. For example, the SSP 18 may play an announcement indicating a dialed telephone number has been changed and providing a new telephone number based on call handling instructions received from the SCP 24.

It should be noted that the SSP 18 is capable of functions other than those mentioned above, such as processing billing records for a call. However, these "other functions" are beyond the scope of this invention, and therefore will not be described in detail herein.

The SCP 24 is an intelligent network element that stores call control and call routing instructions to be executed by the SSP 18. The SCP 24 receives and processes queries received from the SSP 18, and formulates and sends responses and call handling instructions to the SSP 18. The SCP 24 may also process accounting information. The SCP 24 interfaces with and receives commands for controlling services and service features from the SMS 40.

It should be noted that communications between the SSP 18 and SCP 24 may be carried out over a Common Channel Signaling (CCS) network. CCS networks are well known in the art of telecommunications, and are generally used to communicate call control information among network elements. The CSS networks typically employ packet switching techniques to accomplish this task. The packet switches used in CCS networks are commonly referred to as Signal Transfer Points (STPs).

The SMS 40 is a management and provisioning system that serves as an intelligent network service administration platform. The SMS 40 formulates and sends commands to the SCP 24 to control services and service features.

A service feature according to an example embodiment of the present invention is email notification of unanswered telephone calls. A telephone company's subscriber may register to receive an email notification of unanswered telephone calls. When the telephone company's subscriber registers for the email notification service, the subscriber provides an email address at which the subscriber wants to receive the email notifications. Further, the subscriber may also select the information the subscriber would like included in the email. For example, the subscriber may choose to receive the calling party number, the calling party name, the time of the call, and the date of the call. Still further, the subscriber may choose when and how often the email notifications of unanswered telephone calls are forwarded to the subscriber's email. For example, the subscriber may choose to have an email notification sent immediately for each unanswered call or may choose to have the email notifications for unanswered telephone calls sent routinely or periodically, for example, hourly, daily or weekly. Accordingly, the SMS 40 may formulate and send commands to the SCP 24, which are associated with the subscriber's registration for the email notification service.

The IP 26 provides specialized functionality, such as speech recognition (identifying spoken words) and voice recognition (recognizing the voice of a particular speaker) capability. The IP 26 may also perform the functions of a video signal generator or video signal database for applications such as providing images for use in a video telephone call forwarding service. The functionality of the IP 26 may be implemented in a separate network element, or may be implemented through a multimedia SCP. Other examples of services that may be offered through the IP 26 include message recording, message playing, message erasing, voice digit dialing, and name dialing. Intelligent processor equipment suitable for use with example embodiments of the present invention is well known in the art of intelligent network systems.

According to an example embodiment of the present invention, the IP 26 may generate the email notifications of the unanswered telephone calls and forward the email notifications to an email server 50. Accordingly, the IP 26 may obtain call information including the calling party number, the calling party name, the time of the call and the date of the call, and place this information into the body of an email notification. The IP 26 may also record a voice message, convert the recorded message to an audio file and/or text using a speech-to-text converter. The IP 26 may attach the audio file to an email and/or place the text of the recorded message into the body of an email along with statistical information related to the unanswered telephone call. It is noted that while the IP 26 is illustrated as a separate element in FIG. 1, the intelligent processor may reside in one or more of the switches or other elements included in the network. For example, the intelligent processor could reside in mobile telephone switch 30, LEC switch 16, SSP 18, etc.

The email server 50 is used to receive email messages, store email messages in a memory 51 and process email messages in a processor 53. Email servers suitable for use with example embodiments of the present invention are well known in the art. The email server 50 is coupled to a network such as the Internet 60, which can route email messages to various email recipients.

It is noted that there are many well known ways to couple telephone calls between telephone stations and/or elements of the intelligent network architecture. Examples of such coupling, all of which are suitable for use in the present invention, are: standard telephone lines, twisted shielded pair lines, coaxial cables, fiber optic lines, and wireless links. It should also be noted that various types of "calls" and various types of "telephone stations" fall within the scope of the invention. For example, a "call" may take the form of a data transmission from a computer or a fax transmission from a facsimile machine. Moreover, "telephone stations" to which calls are forwarded may include dedicated answering machines, such as a voice mailbox.

Further, as shown in FIG. 1, calls may be routed to the SSP 18 in a variety of ways. For example, a call placed from a mobile phone 28 is routed to SSP 18 through a mobile telephone switch 30, a LEC switch 20 and a 4E switch 22. As another example, a call placed from telephone station 12 and is routed directly to SSP 18 through a LEC switch 16.

Figure 2A:
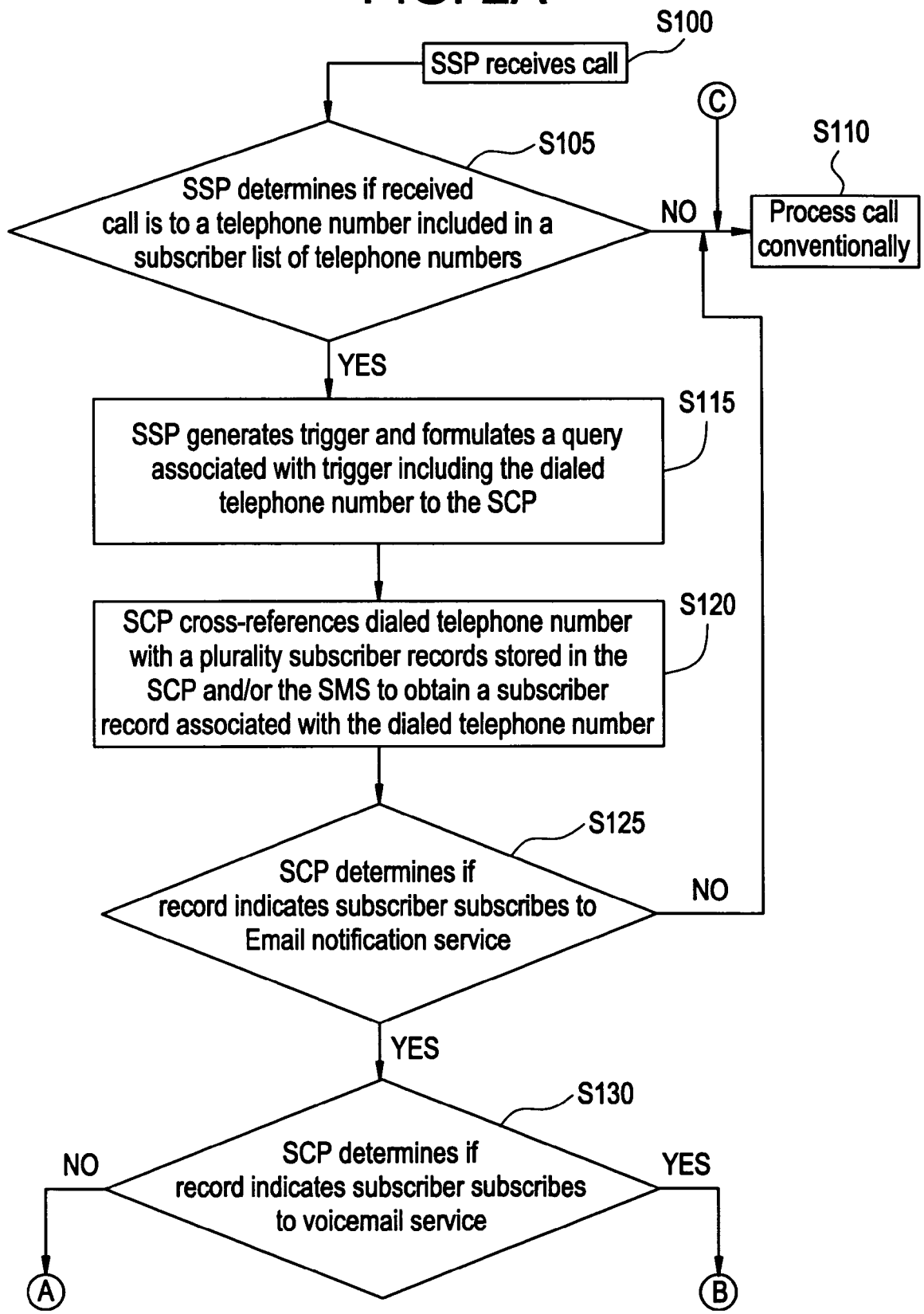
FIGS. 2A and 2B is a flow chart illustrating a method for email notification of unanswered telephone calls according to an example embodiment of the present invention.
Figure 2B:
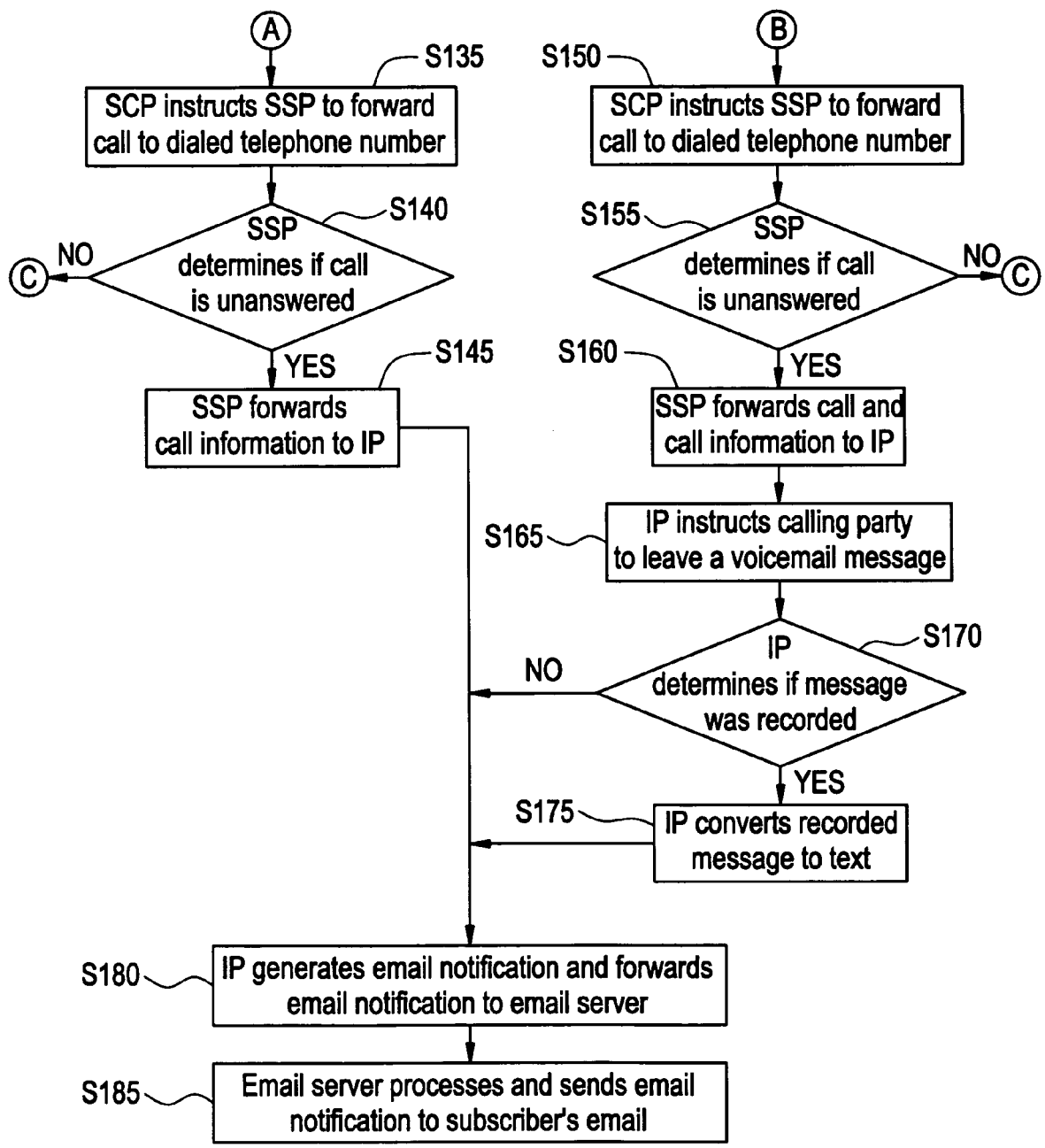

FIGS. 2A and 2B illustrate a flow chart of a method for email notification of unanswered telephone calls according to an example embodiment of the present invention.

In step S100 of FIG. 2A, the SSP 18 receives a telephone call. For example, a calling party dials a telephone number associated with a mobile telephone 28 using telephone station 12, and the SSP 18 receives the call from telephone station 12 via LEC 16. In step S105 of FIG. 2A, the SSP 18 determines if the received telephone call is to a telephone number included in the subscriber list of telephone numbers. The subscriber list of telephone numbers includes telephone numbers of subscribers that have registered for one or more services provided by the service provider. For example, when a subscriber registers for one or more services provided by a service provider, the SMS 40 instructs the SSP 18, either directly or through the SCP 24, to update the subscriber list of telephone numbers to include the subscriber's telephone number. For example, if a subscriber registers the mobile telephone 28 for the email notification service and a voicemail service, the telephone number of the mobile telephone 28 is included in the subscriber list of telephone numbers and a record is created for the subscriber indicating that mobile telephone 28 is registered for the email notification service and voicemail service.

If the SSP 18 determines the received telephone call is directed to a telephone number that is not in the list of subscriber telephone numbers, the call is processed in a conventional manner in step S110.

Alternatively, if the SSP 18 determines the received telephone call is directed to a telephone number included in the subscriber list of telephone numbers in step S105 of FIG. 2A, the SSP 18 generates a trigger, formulates a query associated with the trigger that includes the telephone number of the subscriber and sends the query to the SCP 24 as shown by step S115 of FIG. 2A. For example, a telephone number associated with the mobile terminal 28 registered for the email notification service and the voicemail service would be included in the list and if a call is placed to the mobile telephone number a query including the mobile telephone number would be formulated and sent by the SSP 18 to the SCP 24.

In step S120 of FIG. 2A, the SCP 24 cross-references the telephone number included in the query to a plurality subscriber records stored in the SCP 24 and/or the SMS 40 and obtains a record associated with the telephone number included in the query. The SCP 24 and/or the SMS 40 include a database containing service data for each subscriber. The data is subdivided into subscriber records with each subscriber record including information indicating call handling procedures for the subscriber.

In step S125 of FIG. 2A, the SCP 24 determines if the obtained record indicates the subscriber subscribes to the email notification service. If the record indicates the subscriber does not subscribe to the email notification service, then the call is processed in a conventional manner in step S110 of FIG. 2A. Alternatively, if the SCP 24 determines from the record that the subscriber does subscribe to the email notification service in step S125 of FIG. 2A, then the method for email notification proceeds to step S130 of FIG. 2A.

In step S130 of FIG. 2A, the SCP 24 determines if the record indicates the subscriber subscribes to a voicemail service. If the SCP 24 determines the subscriber subscribes to the voicemail service in addition to the email notification service, the method proceeds to step S150 illustrated in FIG. 2B. Alternatively, if the SCP 24 determines from the obtained record that the subscriber does not subscribe to the voicemail service, then the method proceeds to step S135 in FIG. 2B.

In step S135 of FIG. 2B, the SCP 24 instructs the SSP 18 to forward the call to the telephone number included in the list of subscriber telephone numbers. The SSP 18, then monitors the call to determine if the call is received by the subscriber or is unanswered in step S140 of FIG. 2B. If the call is received, the call is processed in a conventional manner as illustrated in step S110 of FIG. 2A. Alternatively, if the SSP 18 determines the call is unanswered in step S140 of FIG. 2B, the SSP 18 forwards the call information, such as the calling party number, the calling party name, the time of the call and the date of the call, to the IP 26 as shown by step S145 of FIG. 2B. In step S180 of FIG. 2B, the IP 26 generates an email notification and forwards the email notification to the email server 50. Step S180 and S185 of FIG. 2B will be described in greater detail after steps S150-S175 are explained.

As described above, if in step S130, the SCP 24 determines based on the obtained record that the subscriber also subscribes to the voicemail service the method proceeds to step S150 in FIG. 2B.

In step S150 of FIG. 2B, the SCP 24 instructs the SSP 18 to forward the call to the telephone number included in the list of subscriber telephone numbers. The SSP 18, then monitors the call to determine if the call is received by the subscriber or is unanswered in step S155 of FIG. 2B. If the call is received, the call is processed in a conventional manner as illustrated in step S110 of FIG. 2A. Alternatively, if the SSP 18 determines the call is unanswered in step S155, the SSP 18 forwards the call and call information to the IP 26 in step S160 of FIG. 2B.

In step S165 of FIG. 2B, the IP 26 plays a message instructing the calling party to leave a voicemail message for the subscriber. In step S170 of FIG. 2B, the IP 26 determines if the calling party left a voicemail message for the subscriber. If the IP 26 determines a voicemail message was not left for the subscriber, the IP 26 generates an email notification including the call information and forwards the email notification to the email server 50 in step S180 of FIG. 2B. Alternatively, if the IP 26 determines that the calling party did leave a voicemail message for the subscriber, the IP 26 converts the recorded message into an audio file in step S175. Additionally or alternatively, the IP 26 may convert the voicemail to text using a speech-to-text converter. The IP 26 then generates an email notification including the call information and the audio file and/or the text version of the recorded voice message in step S180 of FIG. 2B.

In step S180 of FIG. 2B, the IP 26 generates an email message including the available call information and the audio file and/or the text version of the recorded voicemail message for the subscriber if the subscriber registered for the voicemail service and a voicemail message was left by the calling party. In step S180 of FIG. 2B, the IP 26 sends the email notification to the email server 50.

In step S185 of FIG. 2B, the email server 50 may process the received email in a variety of ways based on the information in and/or included with the received email. For example, the email server 50 may immediately forward the received email to the subscriber via the Internet 60. Alternatively, the received email message may be stored in the memory of the email server 50 for an amount of time before being forwarded if, for example, the subscriber requested that the email notifications for unanswered calls be sent on a periodic basis such as hourly, daily or weekly. Still further, if the subscriber requested that the email notifications for unanswered calls be sent on a periodic basis and the email server 50 receives multiple emails to the subscriber during an amount of time between the periodic email notifications, a processor 53 of the email server may combine the multiple emails into a single email including the information of each unanswered call during the time between the periodic email notifications.

Example embodiments of the present invention allow a subscriber to receive an email notification regarding unanswered telephone calls. Accordingly, a subscriber does not have to be concerned with missing an important telephone call while traveling on a business trip and not being notified of the unanswered telephone call prior to returning from the business trip.

While unanswered telephone calls in the above embodiments have been described as telephone calls forwarded to the dialed telephone number and not answered or received by the subscriber, unanswered telephone calls may also refer to calls that are ended or forwarded to a messaging service because it is known that the subscriber is unavailable.

For example, the subscriber may notify a service provider providing an email notification service and voicemail service that the subscriber will be unable to answer calls for an established period of time and request that calls go directly to voicemail and be reported via email. Or, if no voicemail service is subscribed to, then the call receives a recorded message or busy signal, and the email notification is sent.

According to an example embodiment of the present invention, if the subscriber has notified the service provider he will be unable to answer calls for an established period of time and has registered for both the email notification service and the voicemail, the call handling instructions stored in the database record are updated accordingly. The SCP 24 obtains the updated database record. Because the call handling instructions included in the updated database record indicate the call will not be answered and that the subscriber has registered for both the email notification and voicemail services, the SCP 24 instructs the SSP 18 receiving a call to the subscriber during the established period of time to forward the call to the IP 26. The IP 26 plays a message instructing the calling party to leave a voicemail message for the subscriber. The IP 26 then determines if the calling party left a voicemail message for the subscriber. If the IP 26 determines a voicemail message was not left for the subscriber, the IP 26 generates an email notification including the call information and forwards the email notification to the email server 50. Alternatively, if the IP 26 determines that the calling party did leave a voicemail message for the subscriber, the IP 26 converts the recorded message into an audio file or text. The IP 26 then generates an email notification including the call information and the audio file and/or the text version of the recorded voice message.

According to an example embodiment of the present invention, if the subscriber has notified the service provider he will be unable to answer calls for an established period of time and has registered for the email notification service, but not the voicemail service, the call handling instruction are updated to reflect the notification and email notification registration. The SCP 24 obtains the updated database record. In this embodiment, the call handling instructions included in the updated database record indicate the call will not be answered and the subscriber has only registered for the email notification service. Accordingly, the SCP 24 instructs the SSP 18 receiving a call to the subscriber during the established period to play a busy signal and/or announcement indicating the subscriber is unavailable. The SSP 18 then forwards the call information to the IP 26. The IP 26 generates an email including the call information and forwards the generated email to the email server 50.

According to these example embodiments of the present invention, unanswered telephone calls are the calls that are ended or forwarded directly to the IP 26 because the service provider was notified the subscriber would be unable to answer calls.

Example embodiments of the present invention being thus described, it will be obvious that the same may be varied in many ways. Such variations are not to be regarded as a departure from the invention, and all such modifications are intended to be included within the scope of the invention.

What is claimed:

1. A system for processing a telephone call comprising:
a service control point (SCP) obtaining a database record from a database based on a telephone number of the telephone call, the database record including call handling instructions indicating whether the telephone number is registered to receive email notifications;
a service switching point (SSP) receiving the telephone call, forwarding the telephone call based on the call handling instructions to at least one of an intelligent processor and a terminal associated with the telephone number, and determining the call unanswered;
the intelligent processor creating an email notification of the telephone call if the SSP determines the call unanswered and the call handling instructions indicate that the telephone number is registered to receive email notifications, and sending the email notification based on information associated with the registered telephone number,
the SCP determines if the call handling instructions indicate whether the telephone number is registered to a voicemail service,
the SSP forwards the telephone call to the intelligent processor if the SSP determines that the telephone call is unanswered irrespective if the telephone number is registered to the voicemail service,
if the telephone number is registered to the voicemail service, the intelligent processor instructs a calling party of the telephone number to record a voice message and converts the voice message to a text message to be delivered in the email notification,
if the telephone number is not registered to the voicemail service, the intelligent processor generates the email notification including at least a name and telephone number of the calling party.

2. The system of claim 1, wherein the email notification includes at least one of a calling party number, a calling party name, a time of the call, a date of the call, an audio file of a voice message and text of the voice message.

3. The system of claim 1, wherein the SSP forwards the telephone call to the terminal based on the call handling instructions and determines the call unanswered if the call is not answered.

4. The system of claim 1, wherein the SSP determines the call unanswered based on the call handling instructions indicating the call will not be answered.

5. The system of claim 1, wherein the intelligent processor includes a memory for recording a voice message as an audio file if the call handling instructions indicate the telephone number is registered to receive voicemail service.

6. The system of claim 5, wherein the intelligent processor further includes a speech-to-text converter for converting the recorded voice message to text if the call handling instructions indicate to convert the recorded voice message to text.

7. The system of claim 1, wherein the call handling instructions indicate to send the email notification one of immediately and periodically, and the email notification is sent based on the call handling instructions.

8. The system of claim 1, further comprising:
an email server receiving the email notification from the intelligent processor, storing the email notification and forwarding the email notification to an email address.

* * * * *